(12) United States Patent
Fukuda

(10) Patent No.: US 11,036,205 B2
(45) Date of Patent: Jun. 15, 2021

(54) CONTROL DEVICE AND COMMUNICATION DEVICE

(71) Applicant: OMRON Corporation, Kyoto (JP)

(72) Inventor: Yasunori Fukuda, Ritto (JP)

(73) Assignee: OMRON Corporation, Kyoto (JP)

( * ) Notice: Subject to any disclaimer, the term of this patent is extended or adjusted under 35 U.S.C. 154(b) by 39 days.

(21) Appl. No.: 16/477,531

(22) PCT Filed: Nov. 20, 2017

(86) PCT No.: PCT/JP2017/041659
§ 371 (c)(1),
(2) Date: Jul. 12, 2019

(87) PCT Pub. No.: WO2018/146899
PCT Pub. Date: Aug. 16, 2018

(65) Prior Publication Data
US 2019/0354088 A1    Nov. 21, 2019

(30) Foreign Application Priority Data

Feb. 7, 2017 (JP) .............................. JP2017-020410

(51) Int. Cl.
*G06F 3/00* (2006.01)
*G05B 19/4155* (2006.01)

(52) U.S. Cl.
CPC .................. *G05B 19/4155* (2013.01); *G05B 2219/31001* (2013.01)

(58) Field of Classification Search
None
See application file for complete search history.

(56) References Cited

U.S. PATENT DOCUMENTS

| 5,825,336 A * | 10/1998 | Fujita ..................... G06Q 10/10 345/2.3 |
| 2003/0056043 A1 | 3/2003 | Kostadinov |

(Continued)

FOREIGN PATENT DOCUMENTS

| CN | 101315608 | 12/2008 |
| CN | 101369241 | 2/2009 |

(Continued)

OTHER PUBLICATIONS

"Partial Supplementary Search Report of Europe Counterpart Application", dated Oct. 26, 2020, p. 1-p. 19.

(Continued)

*Primary Examiner* — Henry Tsai
*Assistant Examiner* — Dean Phan
(74) *Attorney, Agent, or Firm* — JCIPRNET

(57) ABSTRACT

This control device comprises a communication unit, one or more functional units, and communication lines that connect the communication unit and the one or more functional units and are independent of each other. The communication unit is configured to execute a first task of sending out, with a first cycle, a first communication frame for executing transmission of data collected by the functional unit to the communication unit and/or transmission of data held by the communication unit to the functional unit via a first communication line among the communication lines, and a second task of sending out, with a second cycle different from the first cycle, a second communication frame for executing transmission of the data collected by the functional unit to the communication unit and/or transmission of the data held by the communication unit to the functional unit via a second communication line among the communication lines.

14 Claims, 11 Drawing Sheets

(56) References Cited

U.S. PATENT DOCUMENTS

| | | | |
|---|---|---|---|
| 2005/0002372 A1* | 1/2005 | Rune | H04W 74/06 370/346 |
| 2006/0218449 A1* | 9/2006 | Blasco Allue | G11C 29/16 714/45 |
| 2007/0286225 A1 | 12/2007 | Enders et al. | |

FOREIGN PATENT DOCUMENTS

| | | |
|---|---|---|
| CN | 101977132 | 2/2011 |
| CN | 103716219 | 4/2014 |
| DE | 102007026457 | 12/2008 |
| JP | H01309445 | 12/1989 |
| JP | H05252163 | 9/1993 |
| JP | 2001016258 | 1/2001 |
| JP | 2004110619 | 4/2004 |
| JP | 2004129287 | 4/2004 |
| JP | 2007027951 | 2/2007 |
| JP | 2007523576 | 8/2007 |
| JP | 2010098362 | 4/2010 |
| JP | 2010224939 | 10/2010 |
| JP | 2014120884 | 6/2014 |
| JP | 2015215669 | 12/2015 |
| JP | 2016194823 | 11/2016 |
| WO | 9515641 | 6/1995 |
| WO | 2013084280 | 6/2013 |

OTHER PUBLICATIONS

"International Search Report (Form PCT/ISA/210) of PCT/JP2017/041659," dated Feb. 13, 2018, with English translation thereof, pp. 1-4.

"Written Opinion of the International Searching Authority (Form PCT/ISA/237) of PCT/JP2017/041659," dated Feb. 13, 2018, with English translation thereof, pp. 1-6.

"Office Action of China Counterpart Application", dated Nov. 27, 2020, with English translation thereof, p. 1-p. 13.

Wikipedia, "Direct memory access", Jan. 24, 2017, pp. 1-8. Available at: https://en.wikipedia.org/w/index.php?title=Direct memory access&oldid=761715418.

"Search Report of Europe Counterpart Application", dated Jan. 28, 2021, p. 1-p. 28.

Office Action of Japan Counterpart Application, with English translation thereof, dated Feb. 24, 2021, pp. 1-12.

* cited by examiner

CONTROL DEVICE AND COMMUNICATION DEVICE

CROSS-REFERENCE TO RELATED APPLICATION

This application is a 371 of international application of PCT application serial no. PCT/JP2017/041659, filed on Nov. 20, 2017, which claims the priority benefit of Japan application no. 2017020410, filed on Feb. 7, 2017. The entirety of each of the abovementioned patent applications is hereby incorporated by reference herein and made a part of this specification.

BACKGROUND

Technical Field

The disclosure relates to a control device including one or a plurality of functional units and to a communication device configuring the control device.

Description of Related Art

Control devices such as programmable logic controllers (PLCs) are widely used as main components for realizing various factory automations (FAs). In such control devices, data is exchanged via communication lines between an arithmetic unit referred to as a central processing unit (CPU) unit and one or a plurality of functional units.

As a typical example of such data exchange, processing (generally referred to as "input output (IO) refresh processing") of transmitting the data collected by the functional unit (also referred to as "input data") to the arithmetic unit and transmitting the data calculated by the arithmetic unit (also referred to as "output data") to each functional unit is cyclically executed.

For example, Japanese Patent Laid-Open No. 2014-120884 (Patent Document 1) discloses an environment and a method for easily determining synchronization timing based on an IO refresh cycle. In the IO refresh processing, since the input data and the output data are transferred by cyclically cycling communication frames, the number of the functional units connected to the communication lines increases. As a result, the transfer time of the communication frames increases, and the IO refresh processing cycle becomes longer.

Regarding such a phenomenon, Japanese Patent Laid-Open No. 2010-224939 (Patent Document 2) discloses a technique that reduces the effort for development of a control computer that executes control processing in a plurality of different cycles for one or more devices to be controlled in the control system and prevents deterioration in communication performance. Specifically, an approach in which transmission data including only necessary control instruction values is created and transmitted according to the cycle of each control processing is adopted.

RELATED ART

[Patent Document]
[Patent Document 1] Japanese Laid-Open No. 2014-120884
[Patent Document 2] Japanese Laid-Open No. 2010-224939

SUMMARY

Technical Problem

According to the approach disclosed in Patent Document 2, it is necessary to schedule the control instruction values to be included in the transmission data according to the cycle of each control processing, which may complicate the processing, and the scheduling processing may reduce the update cycle of the communication processing. Furthermore, according to the approach disclosed in Patent Document 2, the degree of freedom in the design of the control processing and the like may be reduced since the plurality of control processings affect each other.

An object of the disclosure is to solve the problems as described above, and the disclosure provides a new configuration that can secure a predetermined update cycle even if the number of connected functional units increases.

Solution to the Problem

A control device according to an aspect of the disclosure includes a communication unit, one or a plurality of functional units, and a plurality of communication lines that connect the communication unit and the one or the plurality of functional units and are independent of each other. The communication unit is configured to execute a first task of sending out, in a first cycle, a first communication frame for executing at least one of transmission of data collected by the functional unit to the communication unit and transmission of data held by the communication unit to the functional unit via a first communication line among the plurality of communication lines and a second task of sending out, in a second cycle set independently of the first cycle, a second communication frame for executing at least one of transmission of the data collected by the functional unit to the communication unit and transmission of the data held by the communication unit to the functional unit via a second communication line among the plurality of communication lines.

Preferably, each of the one or the plurality of functional units processes only one of any of the communication frames in order for performing data exchange with the communication unit.

Preferably, each of the one or the plurality of functional units transfers a communication frame other than the communication frame to be processed in order for performing data exchange with the communication unit.

Preferably, each of the first communication frame and the second communication frame is provided with data areas associated with the functional units that perform processing.

Preferably, the control device in each of the one or the plurality of functional units further includes a unit that provides a user interface screen for specifying which of the first communication frame and the second communication frame is to be associated with.

Preferably, the communication unit includes an arithmetic processing part including a processor that executes the first task and the second task, and a memory; a communication circuit that handles transmission and reception of communication frames; and a control circuit connected to the arithmetic processing part and the communication circuit. The control circuit includes a first direct memory access (DMA) core for accessing the arithmetic processing part; a second DMA core for accessing the communication circuit; and a controller that gives commands to the first DMA core and the second DMA core sequentially according to a predefined descriptor table in response to a trigger from the arithmetic processing part.

Preferably, the control circuit further includes an activation unit configured to selectively activate a descriptor table designated from among a plurality of descriptor tables set with priorities different from each other in advance, and an arbiter configured to arbitrate based on the priorities set in each of the descriptor tables when processings according to different descriptor tables are simultaneously requested.

Preferably, the plurality of descriptor tables are stored in at least one of the memory of the arithmetic processing part and a memory area of the control circuit.

Preferably, the communication unit is one of an arithmetic unit and a relay unit.

According to an aspect of the disclosure, a communication device connected to one or a plurality of functional units via a plurality of communication lines that are independent of each other is provided. The communication device includes a communication circuit that handles transmission and reception of communication frames in the plurality of communication lines, and an arithmetic processing part. The arithmetic processing part is configured to execute a first task of sending out, in a first cycle, a first communication frame for executing at least one of transmission of data collected by the functional unit to the communication unit and transmission of data held by the communication unit to the functional unit via a first communication line among the plurality of communication lines and a second task of sending out, in a second cycle set independently of the first cycle, a second communication frame for executing at least one of transmission of the data collected by the functional unit to the communication unit and transmission of the data held by the communication unit to the functional unit via a second communication line among the plurality of communication lines.

[Effects]

According to the disclosure, even if the number of the functional units connected to the communication unit increases, the predetermined update cycle can be secured, and the design freedom degree of a plurality of processings executed by the communication unit and the like can be increased.

DESCRIPTION OF THE EMBODIMENTS

Figure 1:
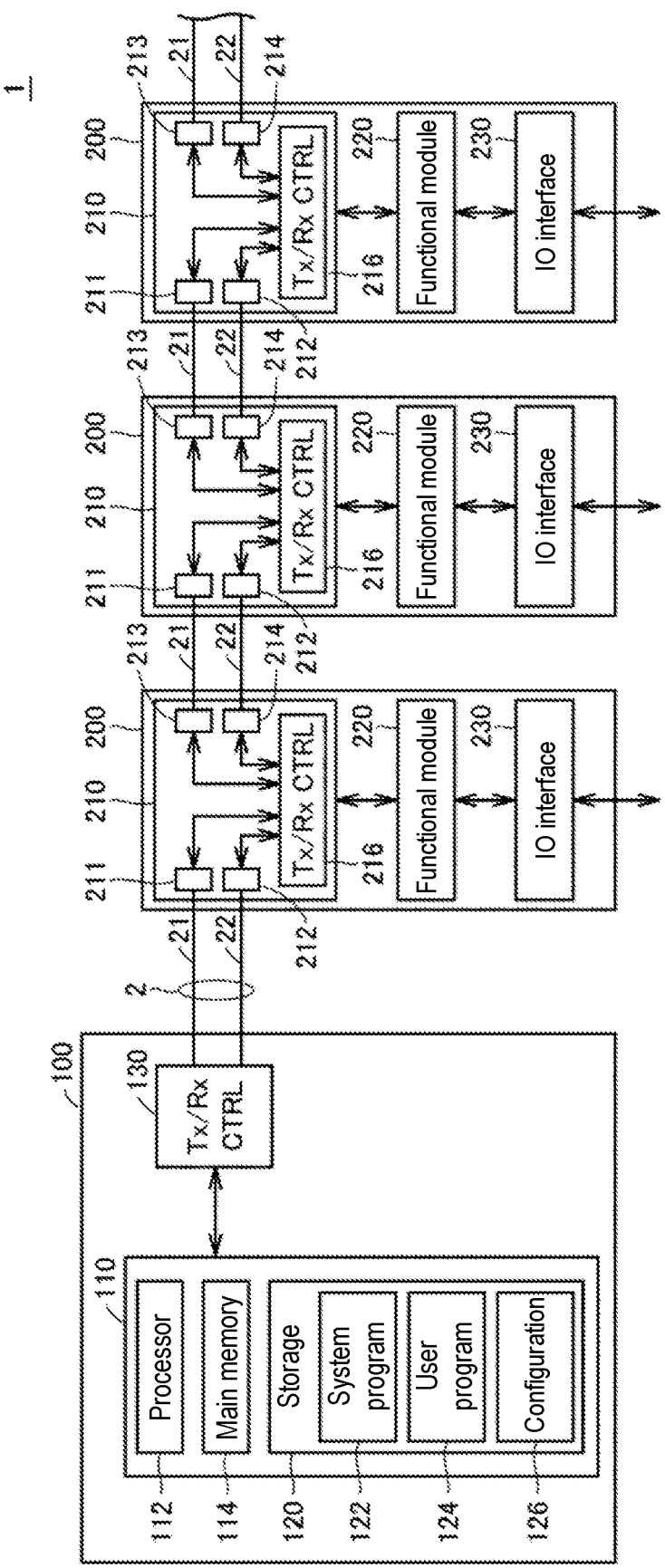
FIG. 1 is a schematic diagram showing a main configuration of a PLC according to Embodiment 1.

Embodiments of the disclosure will be described in detail below with reference to the drawings. Further, in the drawings, identical or corresponding parts are denoted by the same reference numerals and descriptions thereof will not be repeated.

In the following description, a programmable logic controller (PLC) will be described as a specific example to illustrate a typical example of a "control device", but the control device is not limited to the name of PLC, and the technical ideas disclosed in the specification are applicable to any control device.

1. Embodiment 1

<A. Device Configuration>

First, a device configuration of a PLC according to Embodiment 1 will be described. FIG. 1 is a schematic diagram showing a main configuration of the PLC according to Embodiment 1. With reference to FIG. 1, a PLC 1 according to Embodiment 1 is typically configured by a CPU unit 100 and one or a plurality of functional units 200. The CPU unit 100 is an element configuring the PLC 1 and corresponds to an arithmetic unit that controls processing of the entire PLC 1. The functional units 200 provide various functions for realizing control of various machines or equipment by the PLC 1. The CPU unit 100 and the one or the plurality of functional units 200 are connected via a local bus group 2 which is an example of communication lines. For example, a type of daisy chain configuration is adopted as the local bus group 2.

In Embodiment 1, the local bus group 2 has a plurality of channels independent of each other. The local bus group 2 includes a first local bus 21 and a second local bus 22, for example. A configuration having more than two channels may be adopted as the local bus group 2. In this way, the local bus group 2 corresponds to a plurality of communication lines that connect the CPU unit 100 and the one or the plurality of functional units 200 and are independent of each other.

In the configuration shown in FIG. 1, the CPU unit 100 also functions as a communication unit or a communication device. More specifically, the CPU unit 100 may function as a master communication unit that manages the entire communication in the local bus group 2, and the CPU unit 100 may be configured to function as a slave communication unit with which each functional unit 200 performs communication under the management of the CPU unit 100. By adopting such a master/slave configuration, timing control and the like of communication frames transferred to the local bus group 2 can be easily performed.

The CPU unit 100 includes an arithmetic processing part 110 and a communication circuit 130. In addition, it may be a configuration in which the communication unit is disposed separately from the CPU unit 100.

The arithmetic processing part 110 includes a processor 112, a main memory 114, and a storage 120. For convenience of description, only one processor 112 is shown in FIG. 1, but a plurality of processors may be mounted. In addition, each processor may have a plurality of cores.

The main memory 114 is configured by a dynamic random access memory (DRAM), a static random access memory (SRAM), or the like, and provides a work area necessary for the execution of programs by the processor 112.

The storage 120 is configured by a flash memory, a hard disk, or the like, and stores a system program 122, a user program 124, a configuration 126, and the like. The system program 122 includes an operating system (OS) and a library for executing the user program 124 in the processor 112. The system program 122 includes a task for cyclically executing processing (the IO refresh processing to described later) of transmitting field values (input data) collected by the functional units 200 to the CPU unit 100 and transmitting control instruction values (output data) calculated by the CPU unit 100 to the functional units 200. The user program 124 is created as desired according to machines or equipment to be controlled. The configuration 126 includes various setting values necessary for program execution in the CPU unit 100 and various setting values defining a network configuration.

The communication circuit 130 exchanges data with the one or the plurality of functional units 200 via the local bus group 2 which is communication lines. That is, the communication circuit 130 handles transmission and reception of communication frames. More specifically, the communication circuit 130 is physically connected to the local bus group 2, generates an electric signal in accordance with an instruction from the arithmetic processing part 110, and transmits it onto the local bus group 2 (the first local bus 21 or the second local bus 22); in addition, the communication circuit 130 demodulates the electric signal generated on the local bus group 2 (the first local bus 21 or the second local bus 22) and outputs it to the arithmetic processing part 110.

Since the local bus group 2 has channels independent of each other, the local bus group 2 can transfer communication frames independently in each channel. The communication circuit 130 has an independent circuit (not shown) corresponding to each channel, and as described later, data refresh (update) is performed in a cycle set independently for each channel.

In this specification, the "IO refresh processing" refers to processing of executing at least one of transmission of the input data collected by the functional units 200 to the communication unit (the CPU unit 100 or a communication coupler unit 300 to be described later or the like) and transmission of the output data held by the communication unit to the functional units 200. That is, the name of "IO refresh processing" is for convenience of reference and may include the update processing of only one of the input data and the output data.

The communication frames used in the IO refresh processing are transferred by cycling through the local bus group 2 (the first local bus 21 or the second local bus 22). During a period in which the communication frames used in the IO refresh processing are not transferred, the communication frames may be message transferred between the CPU unit 100 and any functional unit 200 or between the plurality of functional units 200.

Any protocol can be adopted as a protocol for exchanging the data on the local bus group 2. Furthermore, although the local bus group 2 is illustrated as an example of the communication lines, the disclosure is not limited thereto, and any fixed cycle network may be adopted. A known network such as EtherCAT (a registered trademark), EtherNet/IP (a registered trademark), DeviceNet (a registered trademark), CompoNet (a registered trademark) or the like may be adopted as such a fixed cycle network.

In the configuration shown in FIG. 1, for convenience of description, the configuration is shown in which the arithmetic processing part 110 and the communication circuit 130 are distinguished, but the disclosure is not limited thereto, and any implementation form can be adopted. For example, it may be configured by a System on Chip (SoC) in which all or part of the arithmetic processing part 110 and all or part of the communication circuit 130 are mounted on the same chip. Such an implementation form is appropriately selected in consideration of requested performance, cost, and the like.

The functional units 200 may typically include an I/O unit, a communication unit, a temperature adjustment unit, an identifier (ID) sensor unit, and the like.

For example, a digital input (DI) unit, a digital output (DO) unit, an analog input (AI) unit, an analog output (AO) unit, a pulse catch input unit, a composite unit obtained by mixing a plurality of types, and the like may be used as the I/O unit.

The communication unit mediates the exchange of data with other PLCs, remote I/O devices, functional units, and the like, and, for example, may include a communication device and the like according to a protocol such as EtherCAT (a registered trademark), EtherNet/IP (a registered trademark), DeviceNet (a registered trademark), CompoNet (a registered trademark) and the like.

The temperature adjustment unit is a control device including an analog input function that acquires a temperature measurement value and the like, an analog output function that outputs a control instruction and the like, and a proportional integral differential (PID) control function. The ID sensor unit is a device that reads data in a non-contact way from a radio frequency identifier (RFID) and the like.

Each of the functional units 200 includes a communication processing part 210, a functional module 220, and an IO interface 230.

The functional module 220 is a part that executes main processing of each functional unit 200 and handles collection of field values (input data) from the machines, the equipment or the like to be controlled; output of control instruction values (output data) to the machines, the equipment or the like to be controlled; and the like.

The IO interface 230 is a circuit that mediates the exchange of signals with the machines, equipment or the like to be controlled.

The communication processing part 210 processes communication frames sequentially transferred on the local bus group 2 (the first local bus 21 or the second local bus 22). More specifically, when the communication processing part 210 receives any communication frame via the local bus group 2, the communication processing part 210 performs data writing and/or data reading on the received communication frame as needed. Thereafter, the communication processing part 210 transmits the communication frame to the functional unit 200 located next on the local bus group 2. The communication processing part 210 provides such a frame relay function. Further, the communication processing part 210, for a communication frame that is not addressed to its own unit, may simply transfer the communication frame to the functional unit 200 located next.

More specifically, the communication processing part 210 includes transmission and reception ports 211, 212, 213 and 214 and a communication circuit 216. The transmission and reception ports 211, 212, 213, and 214 are interfaces physically connected to the local bus group 2 and generate electric signals according to instructions from the communication circuit 216 and transmit them on the local bus group 2. In addition, the transmission and reception ports 211, 212, 213, and 214 convert the electric signals generated on the local bus group 2 into digital signals and output them to the communication circuit 216. In the configuration shown in FIG. 1, the transmission and reception ports 211 and 213 handle the first local bus 21, and the transmission and reception ports 212 and 214 handle the second local bus 22.

The communication circuit 216 performs data writing and/or data reading on a communication frame transferred on the local bus group 2 (the first local bus 21 or the second local bus 22). The communication circuit 216 has independent circuits (not shown) corresponding to the respective channels and can independently process communication frames respectively transferred on the respective channels.

<B. A Plurality of IO Refresh Frames>

In the PLC 1 according to Embodiment 1, with use of the first local bus 21 and the second local bus 22 that configure the local bus group 2, the IO refresh processing can be respectively performed independently in cycles (constant cycles) set independently of each other.

Figure 2:
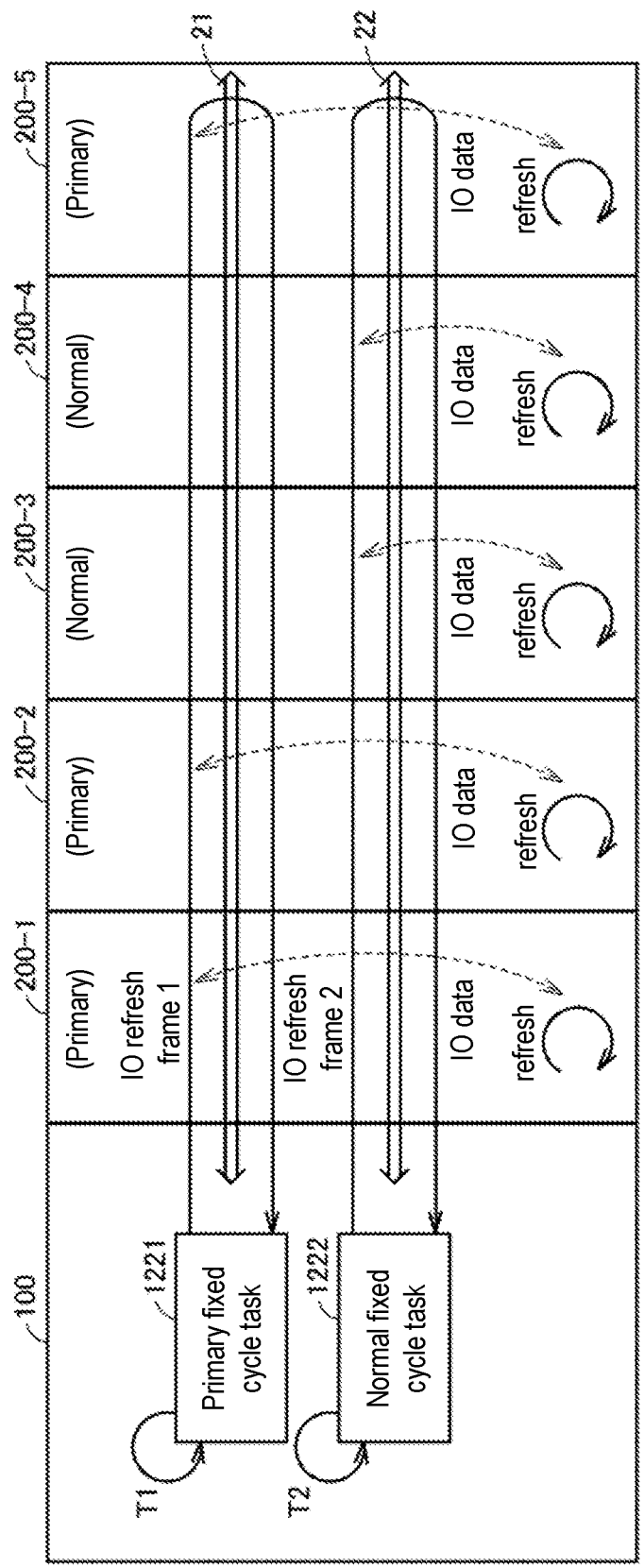
FIG. 2 is a schematic diagram for illustrating an overview of the IO refresh processing in the PLC according to Embodiment 1.

FIG. 2 is a schematic diagram for illustrating an overview of the IO refresh processing in the PLC 1 according to Embodiment 1. With reference to FIG. 2, in the CPU unit 100, a primary fixed cycle task 1221 (repeatedly executed at a constant cycle T1) and a normal fixed cycle task 1222 (repeatedly executed at a constant cycle T2 (>T1)) included in the system program 122 are executed. These tasks are both tasks for realizing the IO refresh processing.

The primary fixed cycle task 1221 repeatedly sends out an IO refresh frame 1 for realizing the IO refresh onto the first local bus 21 in every constant cycle T1. That is, the primary fixed cycle task 1221 executed by the CPU unit 100 is a task of sending out, in the constant cycle T1, the IO refresh frame 1 for executing the IO refresh processing via one communication line (such as the first local bus 21) in the local bus group 2 which is a plurality of communication lines.

Further, the normal fixed cycle task 1222 repeatedly sends out an IO refresh frame 2 for realizing the IO refresh onto the second local bus 22 in every constant cycle T2. These tasks are basically executed independently of each other. That is, the normal fixed cycle task 1222 executed by the CPU unit 100 is a task of sending out, in the constant cycle T2, the IO refresh frame 2 for executing the IO refresh processing via another communication line (such as the second local bus 22) in the local bus group 2 which is a plurality of communication lines.

In addition, due to the limitation of resources of the processor 112, the primary fixed cycle task 1221 may be executed with priority over the normal fixed cycle task 1222.

Each of the functional units 200 performs transmission of the input data and acquisition of the output data using at least one of the IO refresh frame 1 and the IO refresh frame 2. In the example shown in FIG. 2, the CPU unit 100 and the functional units 200-1 to 200-5 are connected via the local bus group 2.

Figure 3A:
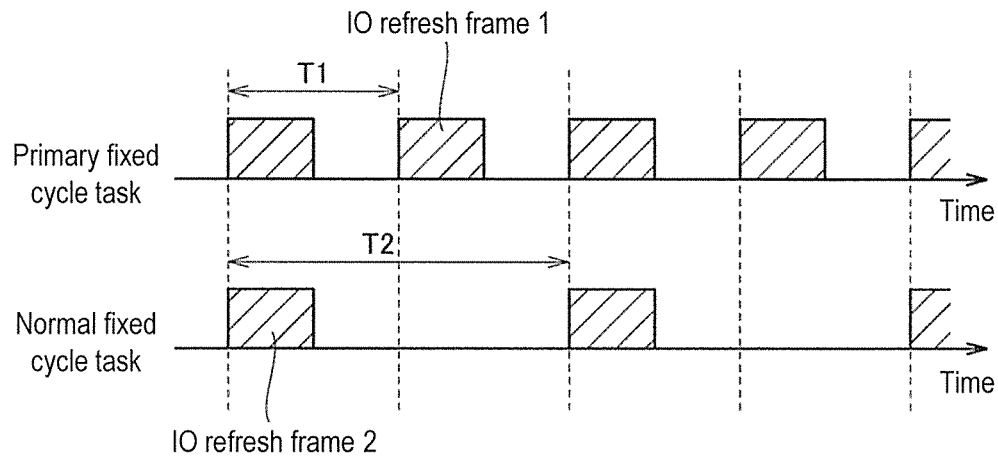
FIG. 3A and FIG. 3B are schematic diagrams for illustrating the IO refresh frames sent out by the primary fixed cycle task and the normal fixed cycle task shown in FIG. 2.
Figure 3B:
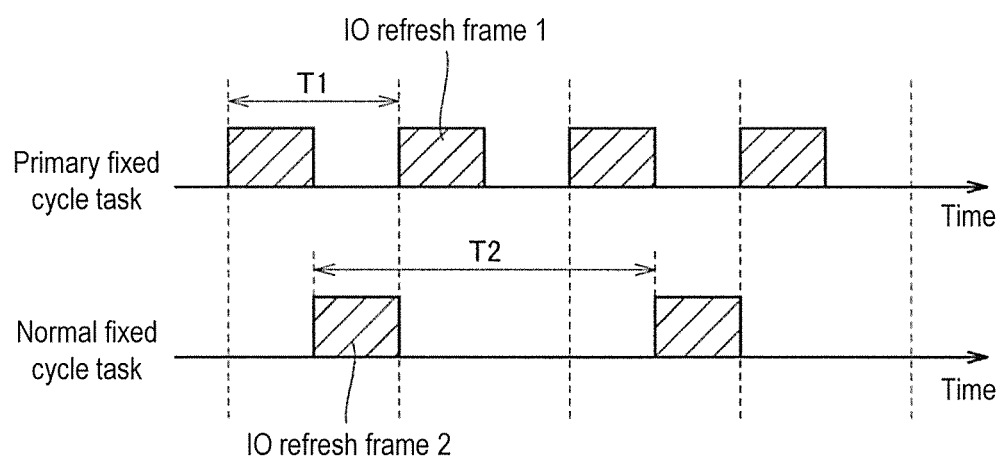

FIG. 3A and FIG. 3B are schematic diagrams for illustrating the IO refresh frames sent out by the primary fixed cycle task 1221 and the normal fixed cycle task 1222 shown in FIG. 2. FIG. 3A shows an example of a state in which the primary fixed cycle task 1221 and the normal fixed cycle task 1222 can be executed independently of each other in the processor 112. As shown in FIG. 3A, the IO refresh frame 1 is sent out from the CPU unit 100 onto the first local bus 21 in every cycle T1 in which the primary fixed cycle task 1221 is repeatedly executed. Similarly, the IO refresh frame 2 is sent out from the CPU unit 100 onto the second local bus 22 in every cycle T2 in which the normal fixed cycle task 1222 is repeatedly executed.

The IO refresh processing in each of the cycles T1 and T2 can be realized with each of the IO refresh frames.

FIG. 3B shows an example of a state in which the primary fixed cycle task 1221 and the normal fixed cycle task 1222 cannot be executed simultaneously in the processor 112. In the example shown in FIG. 3B, the primary fixed cycle task 1221 and the normal fixed cycle task 1222 execute processings in time zones that do not overlap each other. Basically, since the primary fixed cycle task 1221 is set with a higher priority than the normal fixed cycle task 1222, the primary fixed cycle task 1221 may be executed with priority if the execution timings of both tasks overlap due to the cycles or the limitation of the resources.

The IO refresh processing in each of the cycles T1 and T2 can be realized with each of the IO refresh frames in the example shown in FIG. 3B, too.

For convenience of description, FIG. 3A and FIG. 3B show an example in which the cycle T2 for repeatedly executing the normal fixed cycle task 1222 is twice the cycle T1 for repeatedly executing the primary fixed cycle task 1221, but the disclosure is not limited thereto. The cycle T1 and the cycle T2 can be set as desired independently of each other.

<C. Settings of the Functional Units>

With reference to FIG. 2 again, for example, the functional units 200-1, 200-2, and 200-5 are associated with the primary fixed cycle task 1221, and the functional units 200-3 and 200-4 are associated with the normal fixed cycle task 1222.

For each of the functional units 200, a function may be provided to provide a user interface screen for specifying which of the task using the IO refresh frame 1 and the task using the IO refresh frame 2 is to be associated with.

Figure 4:
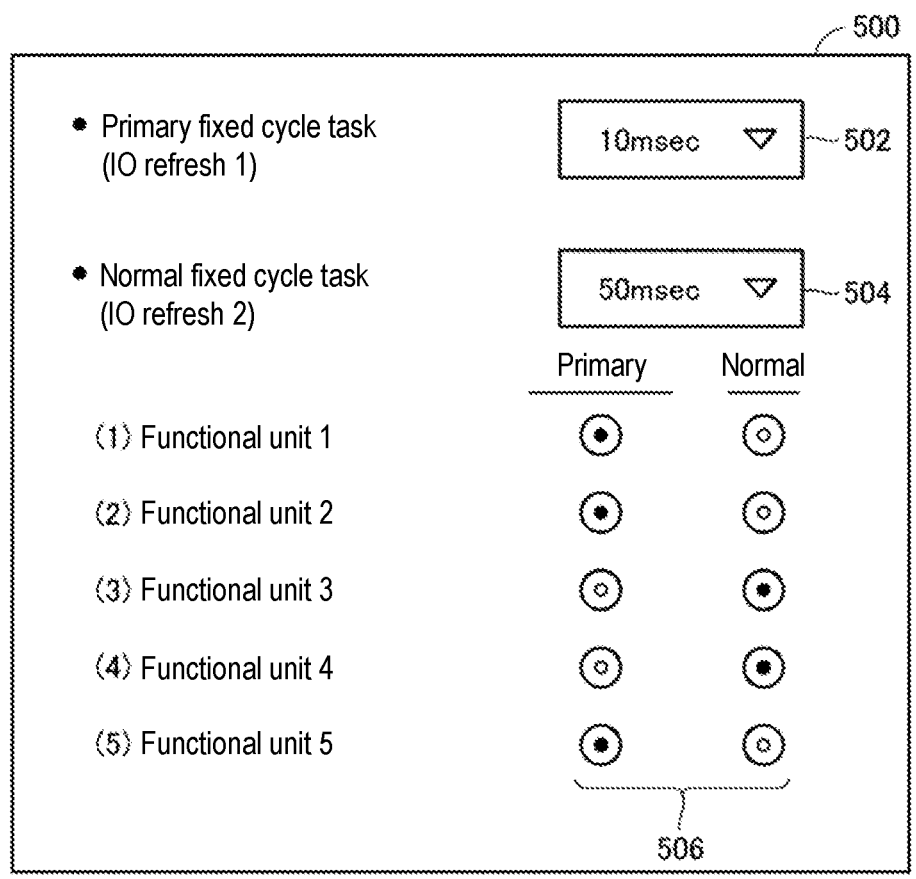
FIG. 4 is a diagram showing an example of a user interface screen for performing settings for the functional units as shown in FIG. 2.

FIG. 4 is a diagram showing an example of a user interface screen 500 for performing settings for the functional units as shown in FIG. 2. The user interface screen 500 shown in FIG. 4 may be implemented in a form such that a screen generated by a function implemented in the communication unit (the CPU unit 100, the communication coupler unit 300 to be described later or the like) is provided on a support device; the user interface screen 500 may be configured to present the screen generated by a function implemented on the support device to the user and to transmit contents set according to the user operation to the communication unit.

With reference to FIG. 4, the user interface screen 500 includes an input item 502 for setting an execution cycle of the primary fixed cycle task 1221, an input item 504 for setting an execution cycle of the normal fixed cycle task 1222, and a radio button group 506 for performing settings for each functional unit 200 connected to the CPU unit 100 via the local bus group 2.

The user performs operations on the input item 502 and the input item 504 of the user interface screen 500 to respectively set the cycle for repeatedly executing each fixed cycle task. Then, the user selects each radio button included in the radio button group 506 to set which of the primary fixed cycle task 1221 (i.e., the IO refresh frame 1) and the normal fixed cycle task 1222 (i.e., the IO refresh frame 2) each functional unit 200 is associated with.

The user interface screen 500 as shown in FIG. 4 is provided, whereby the user can easily perform settings for the fixed cycle tasks and each functional unit 200.

<D. IO Refresh Frames>

Although the IO refresh frame 1 and the IO refresh frame 2 are sequentially transferred to all the functional units 200 connected to the local bus group 2, each of the functional units 200 may be configured to process only any preset IO refresh frame. Further, the input data and the output data may be stored in the same IO refresh frame, or the IO refresh frames dedicated for the input data and the output data respectively may be used.

For example, in the setting example shown in FIG. 2, when the IO refresh frame 1 sent out by the primary fixed cycle task 1221 arrives, each of the functional units 200-1, 200-2 and 200-5 writes the requested input data to the IO refresh frame 1 and reads the target output data from the IO refresh frame 1. On the other hand, when the IO refresh frame 2 sent out by the normal fixed cycle task 1222 arrives, each of the functional units 200-1, 200-2 and 200-5 transfers the received IO refresh frame 2 as it is to the functional unit 200 located next.

Further, when the IO refresh frame 2 sent out by the normal fixed cycle task 1222 arrives, each of the functional units 200-3 and 200-4 writes the requested input data to the IO refresh frame 2 and reads the target output data from the IO refresh frame 2. On the other hand, when the IO refresh frame 1 sent out by the primary fixed cycle task 1221 arrives, each of the functional units 200-3 and 200-4 transfers the received IO refresh frame 1 as it is to the functional unit 200 located next.

In this way, only the functional units 200-1, 200-2 and 200-5 perform data writing and data reading to the IO refresh frame 1, and only the functional units 200-3 and 200-4 perform data writing and data reading to the IO refresh frame 2. That is, in order to perform data exchange with the communication unit (the CPU unit 100, the communication coupler unit 300 to be described later or the like), each of the functional units 200 may process only any one of the communication frames (the IO refresh frames). In this case, each of the functional units 200 transfers the communication frame other than the communication frame to be processed for performing data exchange with the communication unit as it is.

Figure 5:
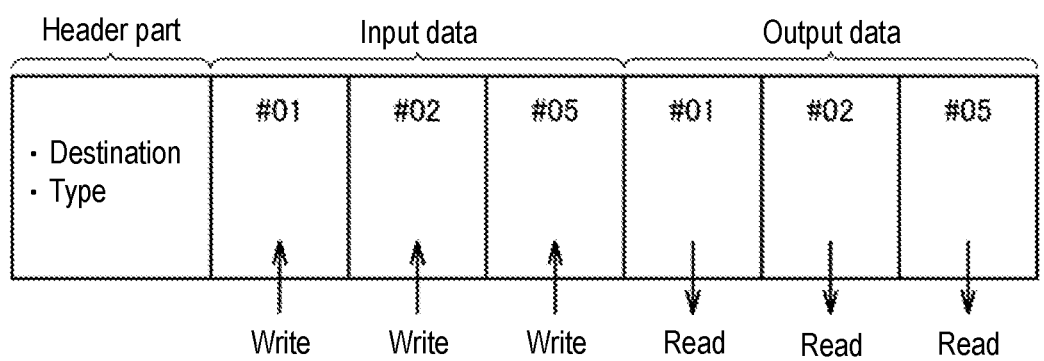
FIG. 5 is a diagram showing an example of data structures of the IO refresh frames corresponding to the settings of the functional units shown in FIG. 2.
Figure 5:
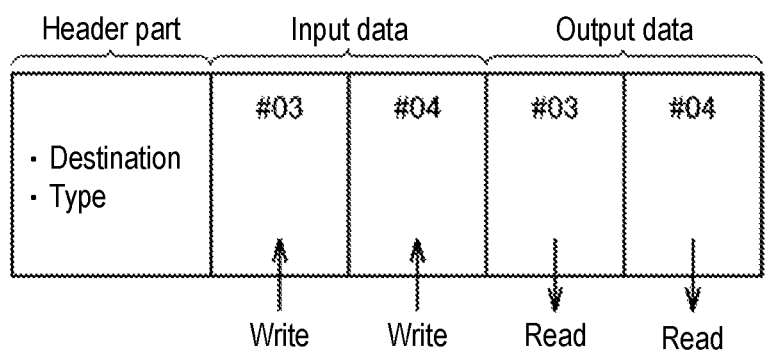

FIG. 5 is a diagram showing an example of data structures of the IO refresh frames corresponding to the settings of the functional units 200 shown in FIG. 2. With reference to FIG. 5, the IO refresh frames 1 and 2 are configured by a header part storing a frame type and a destination, and a main part storing data.

As the frame type, identification information for specifying the type of the communication frame is used, and for example, identification information indicating which of unicast, multicast, and broadcast is used. Since the IO refresh frames 1 and 2 are sent out from the CPU unit 100 and return to the CPU unit 100 after cycling through the local bus group 2, typically, identification information indicating multicast is stored. At this time, in transmission by multicast, a special value may be stored because a specific destination does not exist.

In the main part, areas of the input data and areas of the output data are specified, and the respective areas are determined according to setting values and the like specified by the user interface screen 500 shown in FIG. 4.

Each of the IO refresh frame 1 and the IO refresh frame 2 is provided with data areas associated with the functional units 200 that perform processing. For example, in the IO refresh frame 1 shown in FIG. 5, the areas of the input data and the areas of the output data respectively corresponding to the functional units 200-1, 200-2 and 200-5 are specified. Further, in the IO refresh frame 2, the areas of the input data and the areas of the output data respectively corresponding to the functional units 200-3 and 200-4 are specified.

As described above, in the IO refresh frame 1 and the IO refresh frame 2, it is possible to secure only the data capacity corresponding to the number of the functional units 200 which perform data writing and data reading. Therefore, even if the number of the functional units 200 connected to the CPU unit 100 increases, it is possible to consider only the number of the functional units 200 associated with each of the IO refresh frames, and a case in which the frame length unnecessarily increases does not occur.

Also, for example, even if the functional units 200 associated with the IO refresh frame 2 are added, since the IO refresh frame 1 is not affected, the frame length of the IO refresh frame 1 does not change, and there is no effect on the cycle of the IO refresh processing by the primary fixed cycle task 1221 and the like. Therefore, the degree of freedom in adding the functional units 200 to the CPU unit 100 can be increased.

Alternatively, a single functional unit 200 may be associated with both of the IO refresh frames 1 and 2. In this case, the areas of the input data or the output data of the corresponding functional unit 200 are set in both IO refresh frames 1 and 2, and the writing of the designated input data and/or the reading of the designated output data may be performed no matter which communication frame arrives.

Here, with reference to FIG. 2 again, the relationship between the timing at which the IO refresh frames arrive at each functional unit 200 and the timing of the collection of the field values (the input data) from the machines, the equipment or the like to be controlled and the output of the control instruction values (the output data) to the machines, the equipment or the like to be controlled (in FIG. 2, these processings are collectively referred to as the "internal refresh") in each functional unit 200 will be described.

For example, since the transmission cycle and transmission timing of the IO refresh frames are predetermined, through synchronizing the start timing of the internal refresh of each functional unit 200 with the transmission cycle of the target IO refresh frame, the CPU unit 100 can acquire the input data from each functional unit 200 in the shortest delay time. Such internal refresh in the functional units 200 may be referred to as an input/output synchronization method.

However, it is not necessary to adopt the internal refresh of the input/output synchronization method, and other refresh methods may be adopted. For example, each functional unit 200 may have timers synchronized with each other, and the timing may be determined based on values (count values) indicated by each timer. Such internal refresh may be referred to as a time stamp method. According to the time stamp method, the timing of the internal refresh of each functional unit 200 is not synchronized with the IO refresh frames, but all functional units 200 can perform the internal refresh at the same timing. As a result, even when there are a plurality of transmission cycles of the IO refresh frames, it is easy to maintain consistency between the input data and the output data.

Alternatively, if the synchronization and the like between the input data and the output data are not requested, each functional unit 200 may perform the internal refresh at its own timing or condition. Such internal refresh may be referred to as a free run method. In this case, since it is not necessary to notify the timing and the like to each of the plurality of functional units 200, the processing can be simplified.

<E. Summary>

In the PLC 1 according to Embodiment 1, the local bus group 2 having channels independent of each other is adopted, whereby the IO refresh frames can respectively be transferred independently with use of the respective channels. In this way, each functional unit 200 can perform the IO refresh processing with a more preferable IO refresh frame according to the characteristics and applications of the input data and the output data handled by each functional unit 200.

Through using a plurality of IO refresh frames by the respective channels, as compared with the case of using a single IO refresh frame, an efficient transfer of the input data and the output data becomes possible, and a situation in which the frame length of the IO refresh frame increases and the IO refresh cycle extends can be avoided.

2. Embodiment 2

In Embodiment 1, the configuration in which the IO refresh frames are exchanged between the CPU unit 100 and the one or the plurality of functional units 200 connected via the local bus group 2 has been mainly described. However, the same scheme is applicable to the one or the plurality of functional units 200 connected via a field network.

Figure 6:
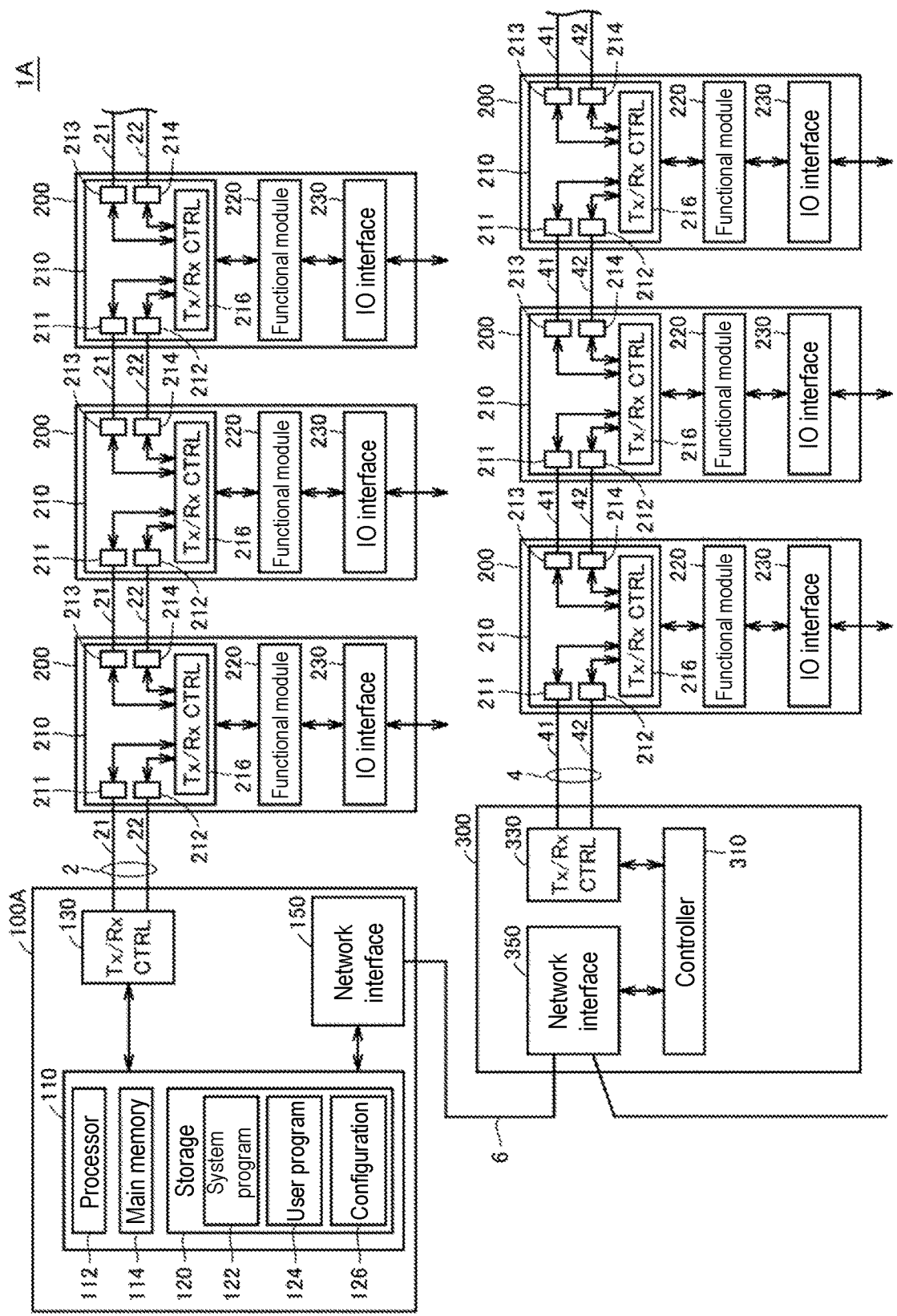
FIG. 6 is a schematic diagram showing a main configuration of a PLC according to Embodiment 2.

FIG. 6 is a schematic diagram showing a main configuration of a PLC 1A according to Embodiment 2. With reference to FIG. 6, a CPU unit 100A of the PLC 1A further includes a network interface 150 that controls a field network 6. Various devices in addition to the communication coupler unit 300 may be connected to the field network 6.

A known network such as EtherCAT (a registered trademark), EtherNet/IP (a registered trademark), DeviceNet (a registered trademark), CompoNet (a registered trademark) or the like, for example, may be adopted as the field network 6.

The communication coupler unit 300 is a relay unit for network connecting the one or the plurality of functional units 200 and the PLC 1A. That is, the communication coupler unit 300 also functions as a communication unit or a communication device. The communication coupler unit 300 may be configured to function as a master communication unit that manages the entire communication in a local bus group 4, and each functional unit 200 may be configured to function as a slave communication unit to perform communication under the management of the communication coupler unit 300. By adopting such a master/slave configuration, timing control and the like of communication frames transferred to the local bus group 4 can be easily performed. More specifically, the communication coupler unit 300 includes a controller 310, a communication circuit 330, and a network interface 350.

The communication circuit 330 exchanges data with the one or the plurality of functional units 200 via the local bus group 4 which is communication lines. More specifically, the communication circuit 330 is physically connected to the local bus group 4, generates an electric signal in accordance with an instruction from the controller 310, and transmits it onto the local bus group 4 (a first local bus 41 or a second local bus 42); in addition, the communication circuit 330 demodulates the electric signal generated on the local bus group 4 (the first local bus 41 or the second local bus 42) and outputs it to the controller 310.

The network interface 350 exchanges data with the CPU unit 100A via the field network 6 which is a communication line.

The controller 310 executes processing of mutually transferring data exchanged with the CPU unit 100A or other devices in the network interface 350 and data exchanged with the one or the plurality of functional units 200 in the communication circuit 330.

Even in such a configuration, the controller 310 of the communication coupler unit 300 can perform the IO refresh processing in different cycles (constant cycles) respectively and independently with use of the first local bus 41 and the second local bus 42 configuring the local bus group 4. More specifically, various setting values are given from the CPU unit 100A to each communication coupler unit 300, and the controller 310 of the communication coupler unit 300 determines the transmission cycle and the like of the IO refresh frames according to the various setting values from the CPU unit 100A.

Since the IO refresh processing by the communication coupler unit 300 is the same as that of the above-described Embodiment 1, detailed description will not be repeated.

By adopting a configuration like the PLC 1A according to Embodiment 2, since the IO refresh frames that are independent of each other can be used not only for the functional units 200 connected to the CPU unit 100A but also for the functional units 200 connected to the communication coupler unit 300, the efficient IO refresh processing can be realized for the PLC 1A as a whole.

3. Embodiment 3

In the CPU unit 100 of the PLC 1 according to Embodiment 1, the arithmetic processing part 110 including the processor 112 gives an instruction to the communication circuit 130, whereby exchange of the IO refresh frames via the local bus group 2 is realized. In order to speed up the exchange of the IO refresh frames via the local bus group 2, a control circuit for exchanging various data with the communication circuit 130 may be further disposed in place of the arithmetic processing part 110. By adopting such a control circuit, arithmetic processing by the processor 112 of the arithmetic processing part 110 can be reduced, and the IO refresh processing can be realized with efficiency and at a high speed even when the transfer capacity of the communication lines between the arithmetic processing part 110 and the communication circuit 130 is relatively small.

<A. Device Configuration>

Figure 7:
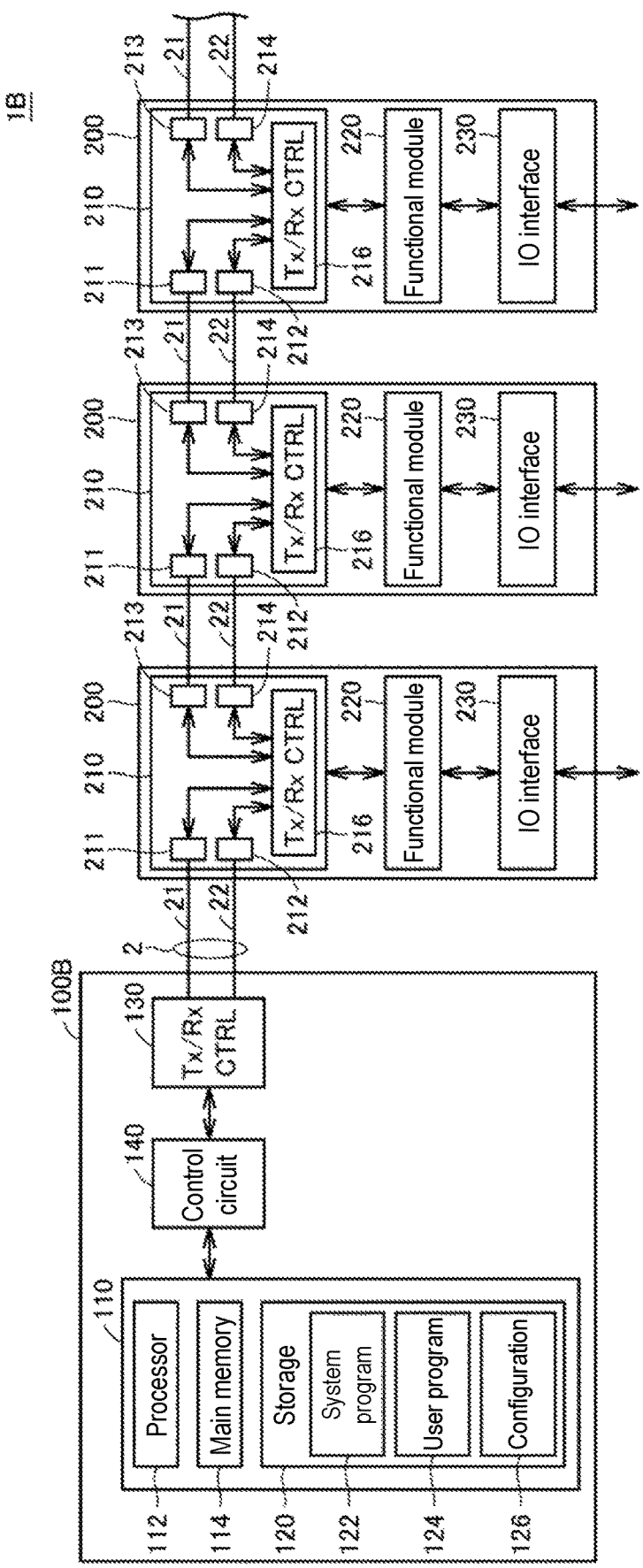
FIG. 7 is a schematic diagram showing a main configuration of a PLC according to Embodiment 3.

FIG. 7 is a schematic diagram showing a main configuration of a PLC 1B according to Embodiment 3. With reference to FIG. 7, a CPU unit 100B of the PLC 1B further includes a control circuit 140 disposed between the arithmetic processing part 110 and the communication circuit 130. The control circuit 140 is connected to the arithmetic processing part 110 and the communication circuit 130 and has a function of mediating a request between the arithmetic processing part 110 and the communication circuit 130. For example, the control circuit 140 responds to a communication request from the processor 112 and gives an instruction to the communication circuit 130 to perform transmission or reception of data. As described later, the control circuit 140 is implemented with, for example, a function for speeding up data access, such as direct memory access (DMA) and the like.

At least the main part of the control circuit 140 may have a hard-wired configuration to realize faster processing than the processor 112. Typically, the control circuit 140 is realized with use of hardware logic. For example, the control circuit 140 may be implemented with use of a field-programmable gate array (FPGA), which is an example of a programmable logic device (PLD), an application specific integrated circuit (ASIC), which is an example of an integrated circuit (IC), or the like. Furthermore, an SoC in which the processor 112 of the arithmetic processing part 110 and the main functions of the control circuit 140 are mounted on the same chip may be used.

Figure 8:
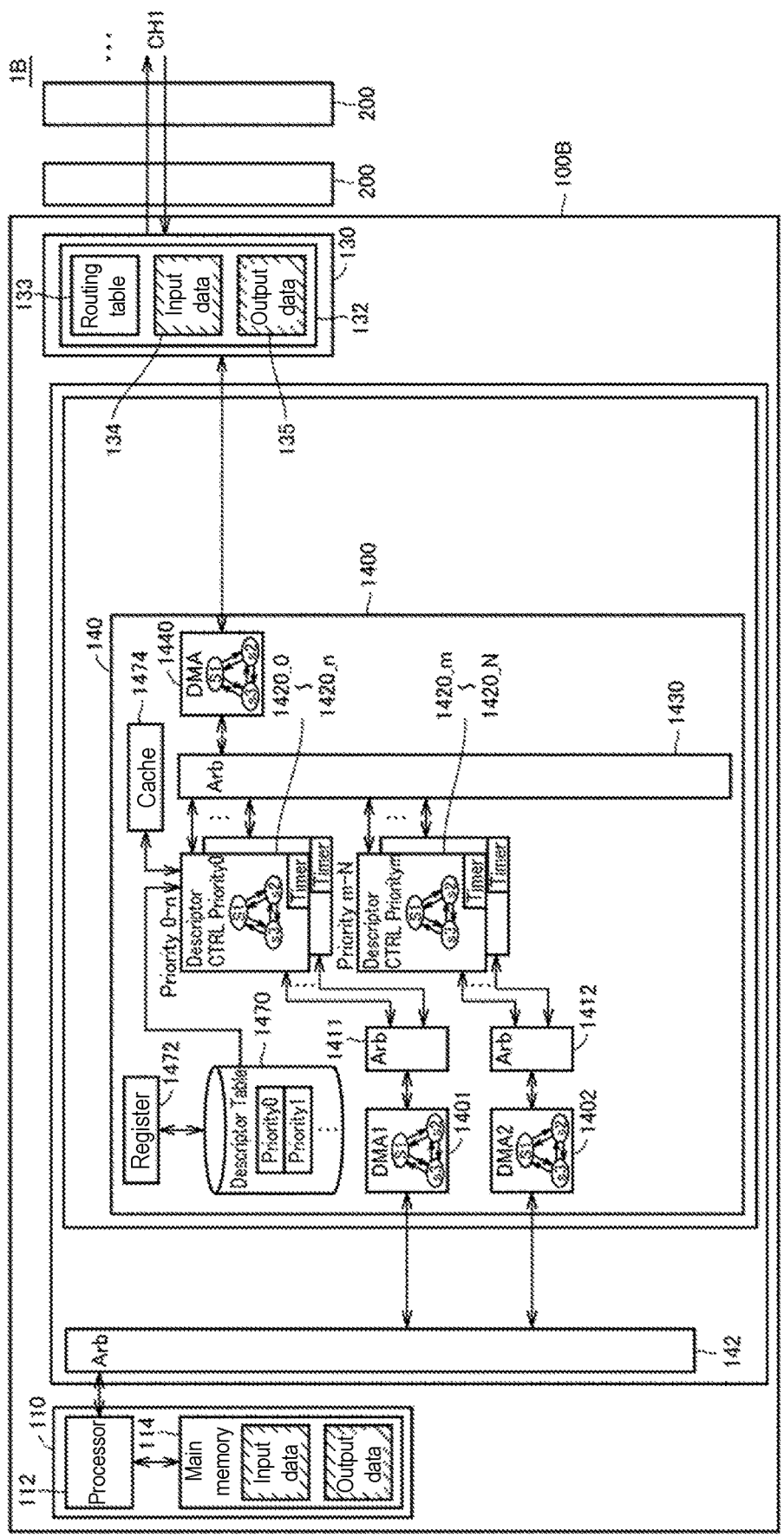
FIG. 8 is a schematic diagram showing a main configuration of the CPU unit of the PLC according to Embodiment 3.

FIG. 8 is a schematic diagram showing a main configuration of the CPU unit 100B of the PLC 1B according to Embodiment 3. With reference to FIG. 8, the CPU unit 100B of the PLC 1B includes the arithmetic processing part 110, the control circuit 140, and the communication circuit 130.

The processor 112 of the arithmetic processing part 110 executes a system program and the like, whereby the IO refresh processing is executed. The input data and the output data are stored in the main memory 114 by the IO refresh processing, and each value is updated according to the IO refresh cycle.

The communication circuit 130 includes a buffer 132 for storing input data 134 and output data 135 exchanged with use of communication frames on the local bus group 2. As described later, the control circuit 140 writes the output data 135 into the buffer 132 of the communication circuit 130 and reads the input data 134 stored in the buffer 132 of the communication circuit 130. The buffer 132 of the communication circuit 130 may store a routing table 133 for determining to transfer a communication frame to a designated destination.

As shown in FIG. 8, it is necessary to synchronize the input data and the output data stored in the buffer 132 of the communication circuit 130 with the input data and the output data stored in the main memory 114 of the arithmetic processing part 110. In Embodiment 3, the control circuit 140 uses DMA to further speed up data transfer while reducing processing such as data access by the processor 112.

More specifically, the control circuit 140 includes a bus arbiter 142 and a processing engine 1400. The control circuit 140 can be implemented with use of any hardware.

The bus arbiter 142 is disposed on a bus connecting the processor 112 of the arithmetic processing part 110 and the processing engine 1400, and arbitrates according to a predetermined rule using priority and the like when a plurality of data access requests conflict.

The processing engine 1400 is a component that provides the main functions of the control circuit 140 and provides a function of proxying the data exchange between the arithmetic processing part 110 and the communication circuit 130.

The processing engine 1400 has a plurality of DMA cores set with priorities (also referred to as "priority") different from each other, and descriptor tables formed by one or a plurality of commands are given to the DMA cores, whereby the designated processing is executed. The descriptor tables are typically described in assembler or machine language. As described later, the priorities are set in the descriptor tables, whereby the DMA cores that process each descriptor table are determined. By using such DMA cores and descriptor tables set with priorities, the IO refresh processing repeatedly executed in the primary fixed cycle task 1221 and the IO refresh processing repeatedly executed in the normal fixed cycle task 1222 can be executed in parallel.

The priorities set in the descriptor tables are used in the management of the access right to the DMA cores 1401 and 1402 for data access to the arithmetic processing part 110; the access right to memories inside the processing engine 1400 such as a descriptor table storage part 1470, a descriptor activation register 1472 and a command cache 1474; the access right for activating the communication circuit 130; the access right to the communication circuit 130; and the like.

Specifically, the processing engine 1400 includes the DMA cores 1401, 1402 and 1440; bus arbiters 1411, 1412 and 1430; descriptor (also referred to as "Descriptor") controllers 1420_0 to 1420_N; the descriptor table storage part 1470; the descriptor activation register 1472; and the command cache 1474.

FIG. 8 shows, as an example, a configuration in which N levels of priorities can be set. N descriptor controllers 1420_0 to 1420_N (also collectively referred to as the "descriptor controllers 1420") are prepared corresponding to the N levels of priorities. Setting the priorities to N levels is an example, and the number of levels can be set as desired. In Embodiment 1, it is assumed that the priority "0" (priority0) is the highest priority, and the priority "N" (priorityN) is the lowest priority.

The DMA cores 1401 and 1402 handle access to the arithmetic processing part 110 (mainly, the main memory 114). In the DMA cores 1401 and 1402, three levels of priorities are set corresponding to the priorities of the descriptor controllers 1420. For example, the DMA core 1401 corresponds to the descriptor controllers 1420 with the priorities "0" to "n", and the DMA core 1402 corresponds to the descriptor controllers 1420 with the priorities "m" to "N".

Further, the two levels of priorities shown in FIG. 8 are an example, and the disclosure is not limited thereto. Any number of DMA cores may be adopted according to the access frequency and the like.

The processing engine 1400 includes arbiters that arbitrate based on the priorities set in each descriptor table when processings according to different descriptor tables are simultaneously requested.

More specifically, the bus arbiters 1411 and 1412 arbitrate command inputs to the DMA cores 1401 and 1402, respectively. That is, the bus arbiter 1411 arbitrates so that the command inputs from the descriptor controllers 1420_0 to 1420_n to the DMA core 1401 do not conflict. The bus arbiter 1412 arbitrates so that the command inputs from the descriptor controllers 1420_m to 1420_N to the DMA core 1402 do not conflict.

The DMA core 1440 handles access to the communication circuit 130 (mainly, the buffer 132). The bus arbiter 1430 arbitrates command inputs to the DMA core 1440. That is, the bus arbiter 1430 arbitrates based on the priorities and the like set in the descriptor controllers 1420 as the command issuing sources so that the command inputs from the descriptor controllers 1420_0 to 1420_N to the DMA core 1440 do not conflict.

The descriptor table storage part 1470 stores commands to be given to the DMA cores. That is, the descriptor table storage part 1470 functions as a type of command buffer.

The descriptor activation register 1472 is formed by registers for setting the priority for each command stored in each descriptor table. In addition to the commands stored in the descriptor table storage part 1470, in the descriptor activation register 1472, addresses for referring to the commands stored in the descriptor table storage part 1470 are set in the register according to the priorities set for the commands. For example, when a command A having the priority of "0" is stored in the descriptor table storage part 1470, an address for referring to the stored command A is set to an area associated with the priority "0" of the descriptor activation register 1472. Further, when a command B having the priority of "1" is stored in the descriptor table storage part 1470, an address for referring to the stored command B is set to an area associated with the priority "1" of the descriptor activation register 1472. Therefore, the descriptor activation register 1472 includes registers associated with the respective priorities.

Then, the commands stored in the descriptor table storage part 1470 are sequentially given to the designated DMA cores based on the register value for each priority set in the descriptor activation register 1472, whereby the processing described in the descriptor table is executed.

As described above, the descriptor table storage part 1470 and the descriptor activation register 1472 are used as part of a function for selectively activating a descriptor table designated from among the plurality of descriptor tables set with priorities different from each other in advance.

The command cache 1474 temporarily stores one or a plurality of commands included in the designated descriptor table. The one or the plurality of commands stored in the command cache 1474 are sequentially given to the designated DMA cores, whereby the described processing is executed.

As described later, any command can be given to the DMA cores by combining the descriptor activation register 1472 with the descriptor table storage part 1470 or with the main memory 114 of the arithmetic processing part 110.

<B. Processing Procedure of the Refresh Processing>

Figure 9:
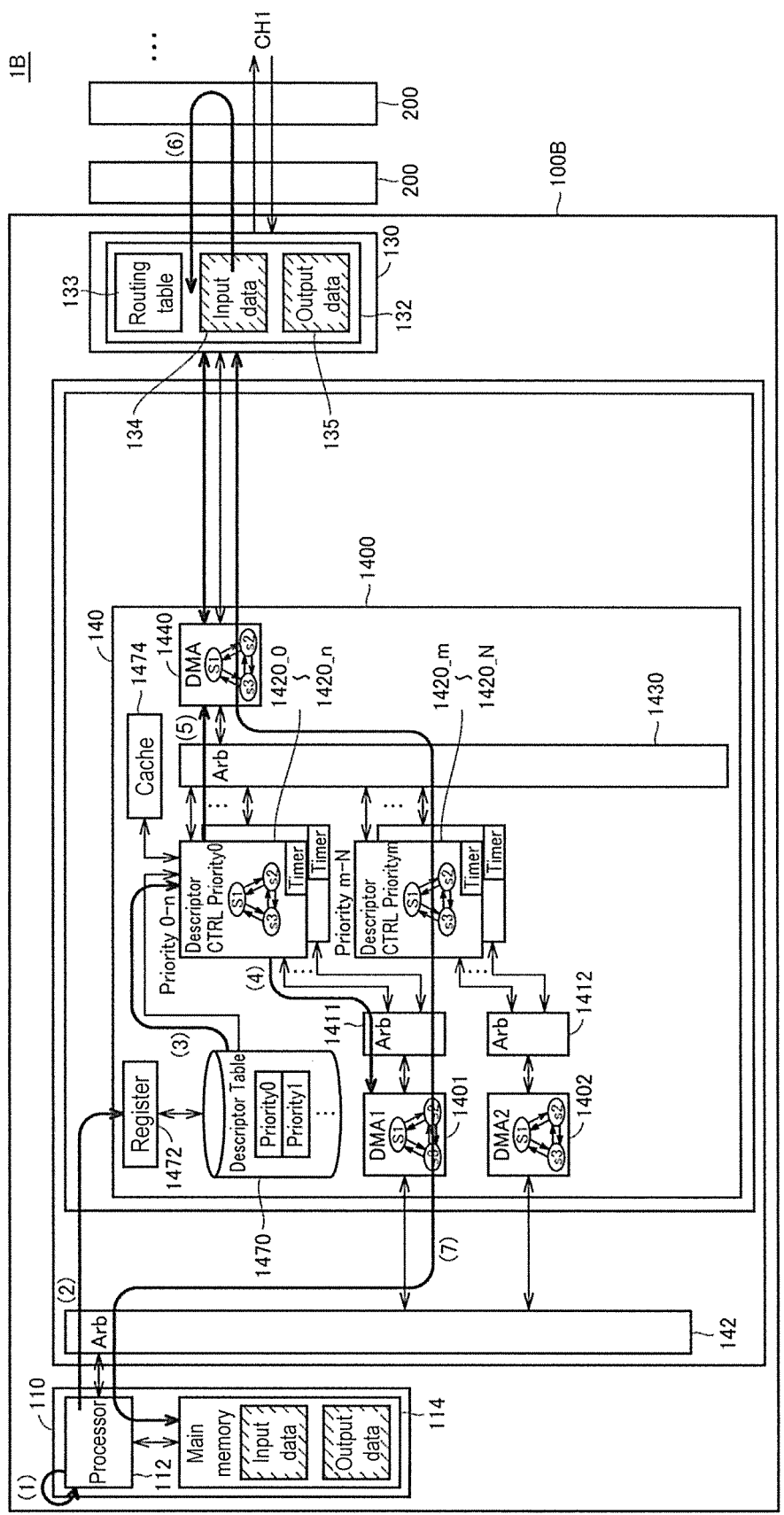
FIG. 9 is a schematic diagram showing a processing procedure of the IO refresh processing in the PLC according to Embodiment 3.

Next, the procedure of the IO refresh processing in the CPU unit 100B shown in FIG. 8 will be described in outline. FIG. 9 is a schematic diagram showing a processing procedure of the IO refresh processing in the PLC 1B according to Embodiment 3. Further, it is assumed that the descriptor table storage part 1470 stores the descriptor tables to which priorities are given in advance.

With reference to FIG. 9, when the task execution cycle arrives and the primary fixed cycle task 1221 or the normal fixed cycle task 1222 is executed ((1) in FIG. 9), the processor 112 of the arithmetic processing part 110 sets, among flags configuring the descriptor activation register 1472, a flag corresponding to the descriptor table which specifies the processing to be executed ((2) in FIG. 9). Then, the descriptor table corresponding to the set flag is given from the descriptor table storage part 1470 to the corresponding descriptor controllers 1420 ((3) in FIG. 9).

The descriptor controllers 1420 give commands to the DMA cores 1401, 1402, and/or the DMA core 1440 sequentially according to a predefined descriptor table in response to a trigger from the arithmetic processing part 110 (the processor 112) ((4) in FIG. 9).

In the IO refresh processing, one or a plurality of commands for instructing issuance of the IO refresh frame and the like are given to the DMA core 1440. According to these commands, the DMA core 1440 activates communication of the communication circuit 130, and the IO refresh frame is sent out from the communication circuit 130 ((5) in FIG. 9).

The IO refresh frame sent out from the communication circuit 130 cycles through the local bus (the first local bus 21 or the second local bus 22), whereby the IO refresh processing is executed ((6) in FIG. 9). In this way, the input data 134 stored in the buffer 132 of the communication circuit 130 is updated.

Then, by data access by the DMA core 1401 and the DMA core 1440, the input data 134 stored in the buffer 132 of the communication circuit 130 is transferred to the main memory 114 of the arithmetic processing part 110, and the output data stored in the main memory 114 of the arithmetic processing part 110 is transferred to the buffer 132 of the communication circuit 130 ((7) in FIG. 9).

The IO refresh processing using the control circuit 140 is completed by the above-described processing procedure.

Although FIG. 9 illustrates the configuration using the descriptor table storage part 1470 and the descriptor activation register 1472 as an example, substantially the same processing procedure is performed even in a configuration in which descriptor tables 148 are stored in the main memory 114.

<C. Data Structures of the Descriptor Tables>

Next, an example of data structures of the descriptor tables will be described.

Figure 10:
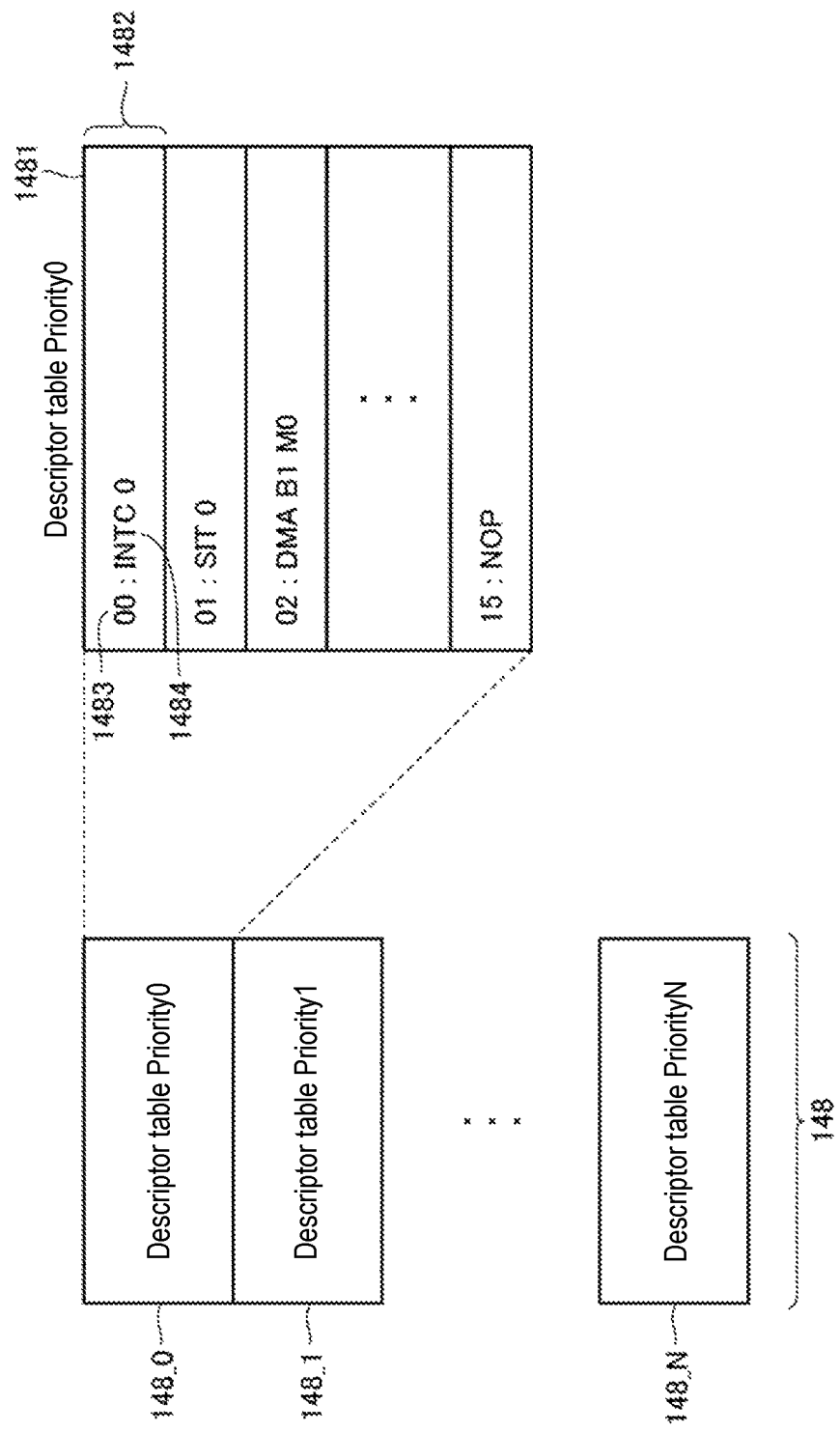
FIG. 10 is a schematic diagram showing an example of data structures of the descriptor tables used in the PLC according to Embodiment 3.

FIG. 10 is a schematic diagram showing an example of data structures of the descriptor tables used in the PLC 1B according to Embodiment 3. With reference to FIG. 10, in the PLC 1B according to Embodiment 3, the descriptor tables 148_0 to 148_N (hereinafter also collectively referred to as the "descriptor tables 148") given with priorities are used. Each of the descriptor tables 148 is configured by one or a plurality of commands 1482, and processing is executed by the DMA cores in accordance with the commands 1482 described in the descriptor tables 148. Each of the commands 1482 is configured by a combination of a command number 1483 and an order 1484. The order 1484 may use assembler or machine language that can be interpreted by the DMA cores.

<D. Activation and Storage of the Descriptor Tables>

Next, an example of an activation method in the case of executing processing by the DMA cores according to the descriptor tables 148 and a storage method of the descriptor tables 148 will be described.

Figure 11:
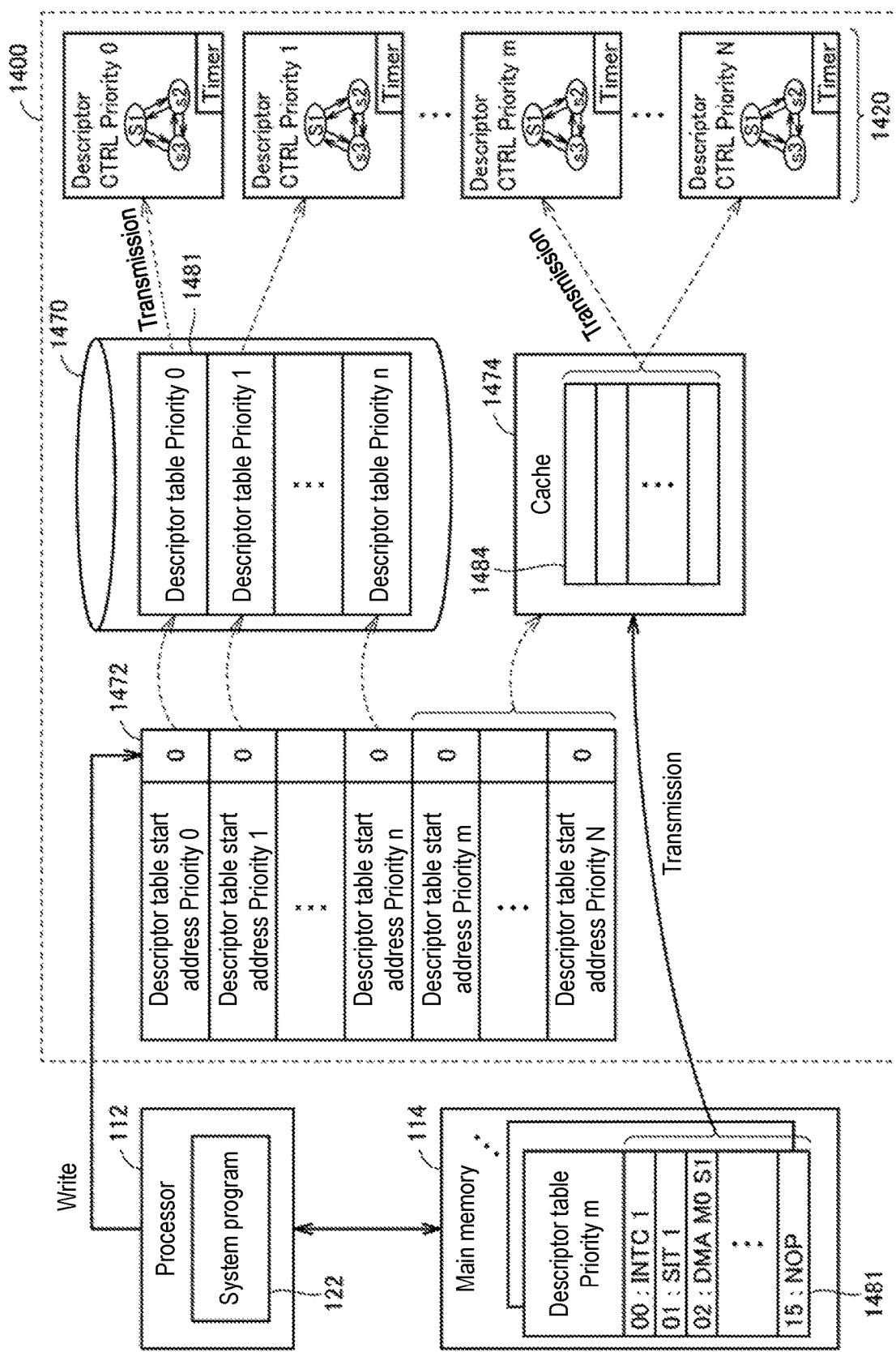
FIG. 11 is a schematic diagram for illustrating the activation and storage of the descriptor tables in the PLC according to Embodiment 3.

FIG. 11 is a schematic diagram for illustrating the activation and storage of the descriptor tables 148 in the PLC 1B according to Embodiment 3. With reference to FIG. 11, for the descriptor tables 148, it is possible to adopt (1) a method in which the descriptor tables 148 are stored in the descriptor table storage part 1470 of the processing engine 1400 and transferred to the descriptor controllers 1420 and (2) a method in which the descriptor tables 148 are stored in the main memory 114 and transferred to the descriptor controllers 1420 via the command cache 1474 of the processing engine 1400.

According to the activation method of (1), it is possible to shorten the time from when the activation instruction is given to when the transfer of the descriptor tables to the descriptor controllers 1420 is completed. However, it is necessary to secure the capacity of the descriptor table storage part 1470.

On the other hand, according to the activation method of (2), more time is required from when the activation instruction is given to when the transfer of the descriptor tables to the descriptor controllers 1420 is completed; however, since the main memory 114 is used, there is little limitation on the capacity.

When the activation method of (1) and/or the activation method of (2) is adopted, the descriptor tables are stored in at least one of the main memory 114 of the arithmetic processing part 110 and the memory area of the control circuit (such as the descriptor table storage part 1470).

For example, in the configuration example shown in FIG. 11, only the eight descriptor tables 148 with high priorities are stored in the descriptor table storage part 1470, and the remaining eight descriptor tables 148 with low priorities are stored in the main memory 114. By adopting both activation methods as shown in FIG. 11 according to priorities, the execution speed of high-priority processing can be increased, and the cost of the CPU unit 100B can be suppressed.

For example, the descriptor tables 148 for realizing the IO refresh processing of the primary fixed cycle task 1221 that requests high-speed processing may be stored in the descriptor table storage part 1470, and the descriptor tables 148 for realizing the 10 refresh processing of the normal fixed cycle task 1222 that requests complex processing may be stored in the main memory 114.

The activation of each descriptor table 148 is performed by writing a flag to the descriptor activation register 1472. In the descriptor tables 148, flag areas corresponding to the number (the number of priorities) of the descriptor tables 148 available to the processing engine 1400 are prepared.

However, the disclosure is not limited to the configuration shown in FIG. 11, and all descriptor tables 148 may be stored in the descriptor table storage part 1470, or all descriptor tables 148 may be stored in the main memory 114.

More specifically, according to the specific activation method of (1), the processor 112 executes the system program 122 to set the flag of the descriptor activation register 1472 corresponding to the designated descriptor table 148 among the descriptor tables 148 stored in the descriptor table storage part 1470. In response to the setting of the flag of the descriptor activation register 1472, the corresponding descriptor table 148 is activated, and the commands of the descriptor table 148 are transferred from the descriptor table storage part 1470 to the corresponding descriptor controllers 1420.

In processing engine 1400 of the PLC 1B according to Embodiment 3, the priorities are respectively set in the plurality of descriptor tables 148, and the descriptor controllers 1420 as the transfer destinations are predetermined according to the respectively set priorities.

On the other hand, according to the specific activation method of (2), the processor 112 executes the system program 122 to set the flag of the descriptor activation register 1472 corresponding to the designated descriptor table 148 among the descriptor tables 148 stored in the descriptor table storage part 1470. In response to the setting of the flag of the descriptor activation register 1472, all or part of the commands included in the designated descriptor table 148 among the descriptor tables 148 stored in the main memory 114 are transferred to the command cache 1474 to be temporarily stored. Then, the stored commands are sequentially transferred from the command cache 1474 to the corresponding descriptor controllers 1420. If all of the commands included in the descriptor table 148 cannot be transferred to the command cache 1474 at one time, the command cache 1474 may be used like a ring buffer to sequentially store and transfer the commands.

According to the above methods, the descriptor tables 148 can be given to the DMA cores, and necessary processing can be executed.

4. Modified Example of Embodiment 3

A configuration and function corresponding to the control circuit 140 included in the PLC 1B according to Embodiment 3 may be implemented in the communication coupler unit 300 shown in FIG. 6. By adopting such a configuration, the processing by the communication coupler unit 300 can also be speeded up.

5. Summary

In the PLC according to the embodiment, a plurality of local buses which are an example of communication lines can be provided, and the 10 refresh processing can be performed in different cycles. In this way, by enabling the plurality of IO refresh processings to be executed independently of each other, when the number of the functional units connected to one CPU unit increases and the data size of the target input data and target output data increases, it is possible to solve the problem that the data size of the communication frames becomes large, that the time required for communication processing becomes long, and that the cycle of the IO refresh processing also has to be lengthened.

Further, by making the cycles of the IO refresh processing different, it is possible to separate the functional units capable of high-speed response from the functional units sufficient for low-speed response. As a result, it is possible to avoid a situation where the capability of the functional units capable of high-speed response cannot be fully utilized due to the increase of the functional units sufficient for low-speed response.

Further, according to the PLC according to the embodiment, DMA is used for accessing the memory, whereby high-speed IO refresh processing can be realized even when the capacity of the communication lines connecting the arithmetic processing part 110 including the processor and the communication circuit 130 is small.

The embodiments disclosed herein are exemplary and should not be construed restrictive in all aspects. The scope of the disclosure is defined by the claims instead of the above descriptions, and it is intended to include the equivalent of the scope of the claims and all modifications within the scope.

What is claimed is:

1. A control device, comprising:
    a communication unit comprising:
        an arithmetic processing part comprising a processor that executes tasks and a memory;
        a communication circuit that handles transmission and reception of communication frames; and
        a control circuit, connected to the arithmetic processing part and the communication circuit, comprising:
            a first direct memory access (DMA) core for accessing the arithmetic processing part;
            a second DMA core for accessing the communication circuit; and
            a controller that gives commands to the first DMA core and the second DMA core sequentially according to a predefined descriptor table in response to a trigger from the arithmetic processing part;
    one or a plurality of functional units;
    a plurality of communication lines that connect the communication unit and the one or the plurality of functional units and are independent of each other,
        wherein the communication unit is configured to execute:
            a first task of sending out, in a first cycle, a first communication frame for executing at least one of transmission of data collected by the functional unit to the communication unit and transmission of data held by the communication unit to the functional unit via a first communication line among the plurality of communication lines and a second task of sending out, in a second cycle set independently of the first cycle, a second communication frame for executing at least one of transmission of the data collected by the functional unit to the communication unit and transmission of the data held by the communication unit to the functional unit via a second communication line among the plurality of communication lines.

2. The control device according to claim 1, wherein each of the one or the plurality of functional units processes only any one of the communication frames in order for performing data exchange with the communication unit.

3. The control device according to claim 2, wherein each of the one or the plurality of functional units transfers a communication frame other than the communication frame to be processed in order for performing data exchange with the communication unit.

4. The control device according to claim 2, wherein each of the first communication frame and the second communication frame is provided with data areas associated with the functional units that perform processing.

5. The control device according to claim 1, further comprising, in each of the one or the plurality of functional units, a unit that provides a user interface screen for specifying which of the first communication frame and the second communication frame is to be associated with.

6. The control device according to claim 1, wherein the control circuit further comprises:

an activation unit configured to selectively activate a descriptor table designated from among a plurality of descriptor tables set with priorities different from each other in advance; and an arbiter configured to arbitrate based on the priorities set in each of the descriptor tables when processings according to different descriptor tables are simultaneously requested.

7. The control device according to claim 6, wherein the plurality of descriptor tables are stored in at least one of the memory of the arithmetic processing part and a memory area of the control circuit.

8. The control device according to claim 1, wherein the communication unit is one of an arithmetic unit and a relay unit.

9. A communication device connected to one or a plurality of functional units via a plurality of communication lines that are independent of each other, the communication device comprising:

a communication circuit that handles transmission and reception of communication frames in the plurality of communication lines;

an arithmetic processing part; and a control circuit, connected to the arithmetic processing part and the communication circuit, comprising:

a first direct memory access (DMA) core for accessing the arithmetic processing part;

a second DMA core for accessing the communication circuit; and a controller that gives commands to the first DMA core and the second DMA core sequentially according to a predefined descriptor table in response to a trigger from the arithmetic processing part, wherein the arithmetic processing part is configured to execute:

a first task of sending out, in a first cycle, a first communication frame for executing at least one of transmission of data collected by the functional unit to the communication unit and transmission of data held by the communication unit to the functional unit via a first communication line among the plurality of communication lines and a second task of sending out, in a second cycle different from the first cycle, a second communication frame for executing at least one of transmission of the data collected by the functional unit to the communication unit and transmission of the data held by the communication unit to the functional unit via a second communication line among the plurality of communication lines.

10. The control device according to claim 3, wherein each of the first communication frame and the second communication frame is provided with data areas associated with the functional units that perform processing.

11. The control device according to claim 2, further comprising, in each of the one or the plurality of functional units, a unit that provides a user interface screen for specifying which of the first communication frame and the second communication frame is to be associated with.

12. The control device according to claim 3, further comprising, in each of the one or the plurality of functional units, a unit that provides a user interface screen for specifying which of the first communication frame and the second communication frame is to be associated with.

13. The control device according to claim 4, further comprising, in each of the one or the plurality of functional units, a unit that provides a user interface screen for specifying which of the first communication frame and the second communication frame is to be associated with.

14. The control device according to claim 10, further comprising, in each of the one or the plurality of functional units, a unit that provides a user interface screen for specifying which of the first communication frame and the second communication frame is to be associated with.

* * * * *